United States Patent [19]

Lewis

[11] 4,341,576

[45] Jul. 27, 1982

[54] FABRICATING LAMINATED SAFETY GLASS WITHOUT AN AUTOCLAVE

[75] Inventor: Charles W. Lewis, Pittsburgh, Pa.

[73] Assignee: PPG Industries, Inc., Pittsburgh, Pa.

[21] Appl. No.: 269,111

[22] Filed: Jun. 1, 1981

[51] Int. Cl.$^3$ .................... B32B 31/12; B32B 17/10
[52] U.S. Cl. .................... 156/106; 156/104; 156/107; 156/308.6; 428/437
[58] Field of Search ............ 156/104, 106, 107, 308.6; 428/437

[56] References Cited

U.S. PATENT DOCUMENTS

| | | | |
|---|---|---|---|
| 3,449,184 | 6/1969 | Balk | 156/105 |
| 3,539,442 | 11/1970 | Buckley et al. | 156/106 X |
| 3,838,091 | 9/1974 | Kanno et al. | 156/106 X |

FOREIGN PATENT DOCUMENTS 355604 9/1931 United Kingdom .
800669 8/1958 United Kingdom .

*Primary Examiner*—Edward C. Kimlin
*Assistant Examiner*—Robert A. Dawson
*Attorney, Agent, or Firm*—Edward I. Mates

[57] ABSTRACT

This invention relates to the lamination of large glass sheets using plasticized interlayer material without the use of autoclaves. Excess liquid plasticizer is applied to the major surfaces of a sheet of plasticized interlayer material to soak the major surfaces at room temperature for sufficient soaking time to soften the surfaces so that the interlayer becomes more amenable to adhesion to glass sheets, but insufficient time to normalize the plasticizer content throughout the thickness of the plasticized sheet. The interlayer sheet is assembled between a pair of glass sheets and the excess plasticizer is removed by compressing the assembly before the soaking time is excessive and the plasticizer concentration can normalize throughout the thickness of the plasticized interlayer sheet. With the excess liquid plasticizer at the interfacial surfaces only, the assembly is subjected to a temperature range above room temperature and below the temperature at which the plasticizer develops a volatile product and a superatmospheric pressure not more than two atmospheres. This removes excess plasticizer from the interfacial surfaces so as to limit the increase in normalized plasticizer content and also permits the sheets to be laminated to one another.

10 Claims, No Drawings

FABRICATING LAMINATED SAFETY GLASS WITHOUT AN AUTOCLAVE

BACKGROUND OF THE INVENTION

1. Field of the Invention

This invention relates to the lamination of large glass sheets using plasticized interlayer material without the use of autoclaves. Normally, plasticized polyvinyl butyral, the most common interlayer material available commercially, has a plasticizer content that optimizes certain characteristics of the resulting laminate, such as its resistance to penetration on impact and the uniformity of adhesion of the interlayer to glass. Generally, to little plasticizer causes the interlayer to be too rigid to flow to conform to the glass during lamination. Too much plasticizer causes the interlayer to soften to the extent that it has poor impact resistance.

Plasticized polyvinyl butyral usually has surfaces that are embossed or patterned. When laminating glass to plasticized polyvinyl butyral, the high temperature and pressure applied within an autoclave smoothes out the patterns or embossments on the major surfaces of the sheet of flexible interlayer material and helps promote the lamination of the plasticized polyvinyl butyral to glass. However, the cost of autoclaves is such that for specialty products that presently have a relatively small market, such as large sized glass sheets of the type that are used for laminated sliding doors for patios and laminated closures for glazing in buildings, the size of the orders for such specialty parts is such that other techniques that do not require the use of an autoclave would be preferred.

It has been suggested to immerse the sheets of an assembly to be laminated within a bath containing additional plasticizer in laminar relation to one another in order to effect a lamination without the use of an autoclave. Such techniques have introduced problems, particularly in attempts to laminate glass sheets of sizes involved in patio doors or larger, because immersing all of the sheets forming the laminate within a bath of plasticizer requires the removal of the plasticizer from the outer surfaces of the resulting laminated unit. When glass units are formed by immersing two glass sheets and a sheet of plasticized polyvinyl butyral in a tank containing additional plasticizer, operators working in such a manner find the plasticizer extremely irritating to their skin and have to use gloves in handling the layers of materials to be laminated. It would be beneficial for the glass sheet laminating art to develop a laminating technique that minimizes the need to expose operators to direct contact with plasticizer.

Interlayer sheeting, particularly polyvinyl butyral, is supplied by manufacturers having an optimum plasticizer content that combines sufficient plasticizer to enable the patterned major surfaces to deform readily and bond to adjacent glass sheets under temperature and pressure conditions that prevail in an autoclave and less than the plasticizer content that causes the interlayer sheet to soften unduly and lose its penetration resistance. However, when an interlayer sheet is exposed to excess plasticizer, its plasticizer content increases at a rate that depends on its temperature of exposure. At low temperatures, the rate of plasticizer increase is too slow to provide a commercially feasible low temperature, low pressure laminating process. At higher temperatures of exposure of the interlayer sheet to a plasticizer bath, it becomes difficult to control a low pressure lamination method to avoid increasing the plasticizer content of the interlayer at an excessive rate to a concentration at which the interlayer gets too soft before it forms a secure bond to the glass sheets of the assembly to be laminated.

The glass laminating art was in dire need of a non-autoclave laminating technique that would provide laminated glass products that had both optical and physical properties commensurate with those obtained by laminating interlayer materials having the optimum plasticizer content in an autoclave. The glass laminating art needed a non-autoclave technique that would work well with interlayer material such as sheets of plasticized polyvinyl butyral that have surfaces that are patterned and would produce laminated units having good penetration resistance as well as good adhesion between the glass sheets and the patterned plastic interlayer.

2. Description of Patents of Interest

British Pat. No. 355,604 to Newtex Safety Glass Company discloses a method of making a laminate of a sheet of cellulose acetate between two sheets of glass by laying a sheet of glass into a suitable bath of a resin in the A stage of its manufacture, laying the cellulose acetate sheet on the glass sheet within the bath, laying the second glass sheet over the cellulose acetate sheet within the bath, removing the assembly from the bath, wiping off excess bath composition from the outer faces and removing surplus bath composition from between the laminae by gentle hand pressure. The resulting assembly is placed in a suitable press and pressed at a pressure of 300 pounds per square inch at 90° to 130° C. for 40 minutes. The immersion is alleged to avoid areas of non-adhesion between adjacent layers of the assembly, but requires autoclave pressures, an expensive solution.

U.S. Pat. No. 3,449,184 to Balk eliminates the need for an expensive autoclave to complete the lamination of laminated glass products by completely immersing alternate sheets of glass and interlayer material in a bath of liquid plasticizer material to inundate said sheets in said bath and arranging said sheets in laminar relation to one another while immersed within said bath. Allegedly, this process may be accomplished in anywhere from about one-half to several hours at room temperature but the process may be accelerated by subjecting products being cured to heat. Unfortunately, the quality of articles so produced does not meet the commercial standards required for present day products.

When, as in both these patents, all the layers of the assembly to be laminated are immersed in a bath of plasticizer, it is necessary to remove the excess plasticizer from the external surfaces of the laminated unit that results. Such a removal step is messy, time-consuming and expensive. It would be desirable to develop a method that avoids such a step.

SUMMARY OF THE INVENTION

According to the present invention, the use of the autoclave has been obviated without causing the plasticizer content of the interlayer to increase an excessive amount. According to a specific embodiment of the present invention, the normalized plasticizer content of the plasticized interlayer is increased by a controlled limited amount following a temporary increase of the plasticizer content at the interfacial surfaces between the plastic interlayer and the glass sheets to improve adhesion and then avoid an increased normalized concentration throughout the thickness of the interlayer to a plasticizer content sufficient to unduly soften the plasticizer. In the specific embodiment, several steps are performed. In the first step, excess liquid plasticizer is applied in such a manner that the major, embossed surfaces of the plasticized interlayer sheet are soaked for a limited time at a relatively low temperature, preferably room temperature, to render the interfacial surfaces of the interlayer sheet more amenable to adhesion with the glass sheets. The interlayer sheet is assembled between a pair of glass sheets. At this time, excess liquid plasticizer is in the surface portions only of the interlayer sheet. Before the excess plasticizer in the surface portions of the interlayer sheet can normalize throughout the thickness of the interlayer, the excess plasticizer is removed by compressing the assembly within a press at an elevated pressure not exceeding two atmospheres. At this pressure, the assembly is heated to an elevated temperature in a range above room temperature and below the temperature at which the plasticizer develops a volatile product. The temperature and pressure of the last step of this treatment are considerably below the normal autoclave temperatures and pressures, but are sufficient to laminate the specially treated interlayer sheets.

The soaking step at room temperature should be from 30 minutes to six hours. A two hour soaking step is usually preferred. The compression force to remove excess plasticizer is limited by the fragility of the glass sheets in the assembly. The final lamination values of pressure, temperature and duration are such as to be the minimum needed to complete the lamination at sub-autoclave conditions in a reasonable time. These can vary with variation of the other parameters of the final lamination step and the size, thickness and warpage of the glass sheets and the plasticity of the interlayer.

A preferred technique to supply excess plasticizer to the opposite surfaces of the interlayer sheet is by immersing the interlayer sheet in a bath of liquid plasticizer. This insures the complete coverage of the surface of the interlayer for sufficient time for the excess plasticizer to soften the interlayer surfaces and renders them more amenable to adhere to glass than would be the case if the interlayer were not immersed. At the same time, the glass sheets are maintained outside the liquid plasticizer bath. During the time that the plasticized interlayer sheet is immersed in the liquid bath of plasticizer, the temperature and time relation is such that the concentration of plasticizer absorbed by the interlayer sheet is limited to the region of its surfaces. The duration of the exposure of the interlayer sheet to the bath of plasticizer is insufficient to enable the concentration of plasticizer to normalize throughout the thickness of the interlayer sheet. After a suitable period of soaking the interlayer sheet surfaces in the liquid plasticizer, the interlayer sheet is assembled between a pair of glass sheets. Excess liquid plasticizer is removed from the interfacial surfaces of the assembly by applying sufficient pressure to the assembly to remove the excess before the assembly is exposed to final laminating conditions of temperature and pressure well below those experienced in autoclave operations.

After the interlayer sheet is removed from the pool of liquid plasticizer, excess liquid plasticizer may be removed from the surfaces of the sheet of interlayer material, if desired. However, it is necessary to maintain a slight excess of plasticizer material at the interfacial surfaces during the assembly of the two glass sheets and the interlayer sheet so as to insure that the interfacial surfaces between the adjacent glass sheets and the opposite major surfaces of the interlayer sheet are free of any air bubbles.

As an alternative, it is possible to apply the liquid plasticizer to the opposite major surfaces of the interlayer sheet without immersion into a bath of liquid plasticizer by supporting a first glass sheet over a suitable support, applying liquid plasticizer to the upper surface of the first glass sheet, and applying a sheet of plasticized interlayer material in unwrinkled condition against the continuous layer of plasticizer applied to the upper surface of the first glass sheet. After the interlayer sheet is assembled against the upper surface of the first glass sheet, a second layer of liquid plasticizer is applied over the upper surface of the interlayer sheet and a second glass sheet is applied over the continuous layer of liquid plasticizer that forms on the upper surface. The major surfaces of the interlayer sheet are soaked in liquid plasticizer while assembled between the first and second glass sheets.

The excess liquid plasticizer must be removed from the interfacial surfaces between the interlayer and each of the glass sheets after a suitable period of soaking. If not removed in a timely manner, the excess inherently increases the softening rate of the interlayer sheet during the final lamination as the plasticizer content increases to a concentration that lowers the penetration resistance of the resulting laminates unduly. Therefore, it is advisable that the excess plasticizer at the interfacial surfaces be removed before the temperature of the assembly is increased to the final lamination temperature.

In a particularly suitable embodiment of the present invention, a polyvinyl butyral interlayer is plasticized with triethylene glycol di-2-ethylbutyrate. A commercial concentration containing 35 parts by weight of plasticizer to 100 parts of polyvinyl butyral by weight is increased to no more than approximately 41 parts by weight of the plasticizer when the major surfaces of the interlayer are soaked for a maximum of six hours at room temperature and the excess plasticizer removed from the interfacial surfaces of the assembly before the final laminating step at a pressure and temperature below autoclave conditions.

Performing the initial soaking with excess plasticizer at approximately room temperature renders the interfacial surfaces of the assemblies more readily adherent to glass. Removing the excess plasticizer before high temperature exposure helps to limit the increase in plasticizer content of the interlayer of the resulting laminate to a small increase over the initial plasticizer content when the plasticizer normalizes throughout the thickness of the interlayer. Thus, a laminate forms having little softening of its interlayer throughout its thickness, so that its impact resistance is acceptable in the trade. At the same time, the interlayer adheres uniformly to the glass sheets so that there is little danger of delamination or of bubble formation at the interfacial surfaces.

While the present invention envisions applying the liquid plasticizer to the interlayer sheet by exposing the interlayer surfaces to liquid plasticizer either before or while assembling the plasticized interlayer sheet between a pair of glass sheets, the present invention avoids any processing by which either glass sheet is immersed in a bath of plasticizer. Once a glass sheet is immersed in a liquid bath, it becomes necessary to remove the excess plasticizer from any glass surface that does not become an interfacial surface of the resulting laminated unit.

Removing liquid plasticizer from an external surface of the resulting laminated unit, a messy procedure of the prior art, is avoided, or minimized, if one follows the teachings of the present invention.

The preferred interlayer sheet is plasticized polyvinyl butyral. The liquid plasticizer used is preferably the same plasticizer used to plasticize the sheet of interlayer material. The liquid plasticizer preferably contains an ingredient selected from the class consisting of triethylene glycol di-2-ethylbutyrate, dibutyl sebacate, dihexyl adipate and many other well-known plasticizers.

The method of this invention can be used in assembling more layers of alternate sheets of interlayer material and sheets of glass by providing augmented assemblies containing at least two sheets of interlayer material and at least three glass sheets. Excess plasticizer is applied only on interfacial surfaces while the outermost surfaces of the outer glass sheets of the augmented assemblies are not subjected to plasticizer.

The present invention is also suitable for assemblying a stack of assemblies or augmented assemblies or mixtures of assemblies with augmented assemblies wherein only each interfacial surface of the assembly is completely covered with an excess of liquid plasticizer applied in such a manner that the outer surfaces of the outer glass sheets of each assembly or augmented assembly in the stack are not subjected to plasticizer. In forming a stack of assemblies and/or augmented assemblies, an outer surface of a first glass sheet of a next assembly in the stack is applied in surface to surface contact against an outer surface of a previous assembly without applying any liquid plasticizer to the interfacial surface between adjacent outer glass sheets of the assemblies that form the stack to exclude plasticizer from the interfacial surface between adjacent assemblies.

These and other benefits of the present invention will be understood better in the light of a description of specific embodiments that follows.

DESCRIPTION OF THE PREFERRED EMBODIMENTS

In a specific embodiment of the present invention, a rectangular glass sheet (preferably float glass, and more particularly, float glass that has been heat strengthened and/or provided with a heat screening coating) is laminated to another heat strengthened glass sheet which may or may not be coated with a heat screening coating to provide a laminated transparency for use in overhead glazing which is usually installed at an oblique angle. In order to avoid the problems of the prior art in which it was difficult to handle the glass sheets within a liquid plasticizer bath, a preferred embodiment of the present invention provides immersing only the plasticized sheet of interlayer material in a liquid plasticizer bath. A solid support surface is provided on a horizontal surface for supporting a first sheet of glass. The solid support surface is preferably at an essentially horizontal orientation, but may be oriented at a small angle to the horizontal and is provided with a pair of pegs to align an edge of the glass sheet properly along its longer dimension. Another peg is mounted to guide the positioning of its shorter dimension while the longer side edge is so aligned. The pegs help to align the sheet of interlayer material over the first sheet of glass and to align a second sheet of glass over the sheet of interlayer material when the sheets are arranged to form an assembly.

EXAMPLE I

A first glass sheet 12 inches (30 centimeters) by 18 inches (45 centimeters) by ¼ inch (0.6 centimeters) was mounted on an essentially horizontal support (which may be at an angle of not more than 5 degrees to the horizontal) and covered over its entire exposed upper surface with a matching sheet of interlayer material removed from a two-hour immersion in a bath of liquid plasticizer (dibutyl sebacate) so that its major surfaces had an excess of liquid plasticizer. The matching sheet of interlayer material was polyvinyl butyral 25 mils (0.6 millimeters) thick plasticized with dibutyl sebacate. The removed interlayer sheet was applied in unstretched and unwrinkled condition over the upper surface of the first glass sheet. An excess of dibutyl sebacate was applied to the central portion of the interlayer sheet at its upper surface. A second glass sheet having the same dimensions as the first glass sheet was mounted with its edge over the corresponding edge of the soaked interlayer sheet. The second glass sheet was gradually lowered onto the upper coated surface of the plasticized sheet of interlayer material to form a continuous covering for the second coating of plasticizer.

The assembly so assembled was held in aligned relation by rubber bands. A peripheral channel member of C-shaped section was applied around the perimeter of the assembly to form an evacuation channel. The channel member was sealed to the assembly to form an entire assembly. The entire assembly was heated to 80° C. after evacuating the evacuation channel by pulling 26 inches (66 centimeters) vacuum. Excess plasticizer was extruded as the vacuum was applied and one of the first seven assemblies so treated was suitably laminated and bubble free. The remaining six assemblies were laminated except for some bubbles.

EXAMPLE II

The procedure of EXAMPLE I was used to assemble glass sheets 30 inches (76 centimeters) square with a soaked sheet of polyvinyl butyral plasticized with dibutyl sebacate. The plasticized sheet was soaked for three hours in a bath of dibutyl sebacate. Final lamination was accomplished in a press at 80° C. for five hours instead of using the evacuation channel of EXAMPLE I with 15 pound inches (1.70 Newton meters) torque applied to each bolt on the press. The perimeter of the laminated assembly was cracked but the sheets were otherwise well laminated.

EXAMPLE III

Eleven of twelve assemblies each 12 inches (30 centimeters) square were successfully laminated to interlayer sheets of polyvinyl butyral plasticized with dibutyl sebacate using a two hour soak for the interlayer sheets in a dibutyl sebacate bath followed by an assembly as in EXAMPLE II only with 10 pound inches (1.13 Newton meters) torque applied to each bolt in the press for five hours at 80° C. The resulting laminates were free of bubbles.

EXAMPLE IV

Further experiments were performed on glass-polyvinyl butyralglass assemblies to test the combination of various soaking times at room temperature followed by final lamination at a lower than autoclave pressure and at various temperatures below the temperature at which the plasticizer develops a volatile product and at various superatmospheric pressures not exceeding two atmospheres. In these latter experiments, instead of immersing the interlayer sheets in a bath of plasticizer to effect soaking, a first glass sheet was supported on an essentially horizontal surface with its lower major surface in direct engagement against a support surface, an excess of liquid plasticizer was applied to the upper major surface of the first glass sheet at room temperature, a sheet of interlayer material was applied in unwrinkled condition over the excess liquid plasticizer, an excess of liquid plasticizer applied to the upper surface of the superimposed sheet of interlayer material at room temperature, and a second sheet of glass applied over the second layer of liquid plasticizer. The excess liquid plasticizer was removed from the interfaces after a suitable soaking period at room temperature by applying a press to clamp the sheets of the assembly at the pressure of the final laminating step. Upon extrusion of the excess liquid plasticizer, the assembly was heated to the indicated laminating temperature while maintaining the laminating pressure. Results obtained for groups of ten samples containing polyvinyl butyral sheets plasticized with one or another of two different plasticizers (triethylene glycol di-2 ethylbutyrate, hereinafter called 3GH, and dibutyl sebacate, hereinafter called DBS) and subjected to a different treatment for each group are recited in TABLE I.

TABLE I

| Plasticizer | Soak Time (Hours) | Laminating Time (Hours) | Laminating Temperature (°C.) | Pressure (Pascals) | Optics |
| --- | --- | --- | --- | --- | --- |
| 3GH | 24 | 16 | 80 | 3200 | Excellent |
| 3GH | 24 | 16 | 20 | 3200 | Good |
| 3GH | 24 | 6 | 80 | 3200 | Poor |
| 3GH | 24 | 30 | 20 | 3200 | Excellent |
| 3GH | 24 | 24 | 20 | 3200 | Excellent |
| 3GH | 24 | 72 | 20 | 3200 | Excellent |
| 3GH | 6 | 24 | 120 | 3200 | Excellent |
| 3GH | 6 | 48 | 20 | 3200 | Excellent |
| 3GH | 6 | 40 | 120 | 3200 | Excellent |
| DBS | 6 | 48 | 80 | 3200 | Excellent |
| DBS | 6 | 16 | 80 | 3200 | Good |
| DBS | 6 | 16 | 20 | 3200 | Excellent |
| DBS | 6 | 72 | 120 | 3200 | Excellent |
| DBS | 6 | 24 | 120 | 3200 | Excellent |
| DBS | 6 | 40 | 20 | 3200 | Excellent |

The aforesaid experiments were performed with assemblies 12 inches (30 centimeters) square. While excellent optical properties were observed, the impact resistance of the resulting laminates left something to be desired. Further experiments with assemblies 12 inches (30 centimeters) square established that a two hour soaking time at room temperature followed by five hours lamination at 3200 Pascals at 80° C. provided both good optics and good penetration resistance.

Having determined the feasibility of the operation for laminating single assemblies, additional efforts were directed to assembling a plurality of assemblies and stacking the plurality of assemblies in a stack. The following operating parameters were developed: 2 heat-strengthened sheets of float glass having a nominal thickness of ¼ inch (6.3 millimeters) or ⅛ inch (3.1 millimeters), one being coated and the other being clear, were laminated with plasticized polyvinyl butyral using as a plasticizer the same plasticizer used to plasticize the polyvinyl butyral, namely Flexol 3GH (triethylene glycol di-2-ethylbutyrate) or DBS (dibutyl sebacate) or Santicizer 332 (a plasticizer believed to contain 75 parts by weight of di-n-hexyl adipate plus 25 parts by weight of butyl benzyl phthlate). A treatment comprising two hours of soaking time for laminates made with triethylene glycol di-2-ethylbutyrate plasticizer followed by 10 hours of a lamination step at 175 degrees Fahrenheit (79 degrees Celsius) and 4.7 pounds per square inch pressure (3200 Pascals) produced 100% lamination, which provided excellent optics throughout the entire extent of the laminated units. Suitable results were also obtained when the lamination step was terminated at 8 hours. However, for commercial operations, the lamination step was continued for 10 hours to ensure an adequate product.

When the lamination was performed at temperatures in excess of 100 degrees Celsius, water bubbles were observed in the ultimate product. These bubbles were investigated and found to be related to a high moisture content in the interlayer developed by storing the interlayer sheets at room temperature at 40% relative humidity. This problem was avoided subsequently by storing interlayer sheets at relative humidities not exceeding 20% at room temperature for at least 24 hours prior to starting the soak cycle.

It is understood that while a stack comprising several assemblies could be made, seven being suitable for production purposes, that it is also within the purview of the present invention to provide augmented assemblies containing two or more interlayers alternating with three or more glass sheets. The same parameters appear to be applicable for the laminate to form an ultimate laminated product having good optical properties and good penetration resistance.

It has been observed that during the soaking of laminates containing triethylene glycol di-2-ethylbutyrate (3GH) at room temperature, 1.5 grams per square centimeter is absorbed per hour during soaking at room temperature. In interlayers of 30 mils (0.76 millimeters) thickness and interlayers of 60 mils (1.52 millimeters) thickness, the amount of plasticizer absorbed is insufficient to normalize throughout the thickness of the interlayer during the two hours of soak time which appears to be maximum time necessary to soften and dissolve the ribs formed on the patterned surfaces of the interlayer material sufficiently to obtain results that correspond approximately to the results obtained by prepressing in the prior art that continued with a final lamination step in a high pressure, high temperature autoclave. Particular ribs are 1.5 to 2 mils (0.038 to 0.051 millimeters) deep and there are spaces 26 mils (0.66 millimeters) wide between ribs.

A commercial operation developed to produce laminates approximately 59 inches (150 centimeters) long and 52 inches (132 centimeters) wide of two glass sheets 221 mils (5.6 millimeters) thick of heat strengthened clear float glass laminated to an interlayer of plasticized polyvinyl butyral 60 mils thick plasticized with triethylene glycol di-2-ethylbutyrate involved a two hour soaking period at room temperature followed by 10 hours of lamination at 180 degrees Fahrenheit (82 degrees Celsius) at a pressure of 4.7 pounds per square inch (3200 Pascals). This operation made commercially acceptable laminates in stacks of seven assemblies in height.

In another example, a pair of clear float glass sheets having ⅛ inch (3.1 millimeters) nominal thickness was laminated to a 60 mil (1.52 millimeters) thick interlayer of polyvinyl butyral plasticized with triethylene glycol di-2-ethylbutyrate. The glass sheets were 76 inches (193 centimeters) long and 34 inches (86 centimeters) wide.

A stack seven assemblies high was fabricated using a 2 hours soak time and 8 hours of lamination at a pressure of 4.7 pounds per square inch (3200 Pascals) and a temperature of 180 degrees Fahrenheit (82 degrees Celsius).

If it is desired to build a stack of assemblies for simultaneous lamination, a first glass sheet of an added assembly is mounted directly against the second glass sheet of the assembly just completed without applying any plasticizer to the upper surface of the second glass sheet of the previous assembly and the steps taken to assemble the first assembly are repeated for as many assemblies desired in the stack (usually up to ten).

The stack of assemblies is soaked at room temperature without any additional pressure for from fifteen minutes to two hours after the stack is completed. One half hour of soaking is preferred.

A press applies a pressure of 4.7 to 7.7 pounds per square inch (3200 to 5200 Pascals) at room temperature to remove excess liquid plasticizer. All excess plasticizer from the previous steps is collected and filtered for reuse.

The assembly, while subjected to the low superatmospheric pressure, is heated to 225 degrees Fahrenheit (117 degrees Celsius) for one to ten hours after the elevated temperature is reached. Preferred minimum laminating times are one hour for a stack of one to two assemblies, two hours for a stack of three to five assemblies and three hours for a stack of six to eight assemblies.

After the temperature and pressure exposure is completed, the laminated units are removed from the press and razor blades are used to trim the excess plasticized interlayer material that extends beyond the margin of the glass sheets. The laminated units are ready for inspection and shipping after they are run through a commercial washer.

While the laminated units described previously relate to those comprising glass sheets and plasticized polyvinyl butyral, it is understood that the term "glass" is not limited to conventional soda-lime-silica glass compositions such as float glass, but is also intended to include specialty glass products and even rigid, transparent materials that are well known substitutes for glass, such as polycarbonates, acrylics, polyesters and polyurethanes. The interlayer material need not be limited to plasticized polyvinyl butyral, but may also include any other interlayer material that is softened and rendered more amenable to adhesion by the addition of a plasticizer and wherein the plasticizer reacts with a sheet of interlayer material as a function of time and temperature.

The form of the invention shown and described herein represents an illustrative preferred embodiment and certain modifications thereof. It is understood that various changes may be made without departing from the gist of the invention as defined in the claimed subject matter which follows.

I claim:

1. A method of fabricating a laminated glass window comprising a pair of glass sheets and a plasticized sheet of interlayer material having embossed major surfaces comprising:
   (a) applying to the major surfaces of said sheet of plasticized interlayer material an excess of liquid plasticizer,
   (b) assembling said plasticized sheet between a pair of glass sheets to form an assembly having said excess of liquid plasticizer in contact with the major surfaces of said plasticized sheet,
   (c) soaking said major surfaces of said plasticized sheet with said excess plasticizer at room temperature for sufficient time for the applied plasticizer to soften said embossed major surfaces, but insufficient to normalize the plasticizer concentration throughout the thickness of said plasticized sheet, and
   (d) compressing said assembly at a superatmospheric pressure of not more than two atmospheres to remove excess plasticizer and heating said assembly while so compressed to a temperature range above room temperature and below the temperature at which said plasticizer develops a volatile product to laminate said sheets completely to one another while maintaining the surfaces of said glass sheets of said assembly that do not form interfacial surfaces with said plasticized sheet free of exposure with said plasticizer during the performance of said method.

2. The method as in claim 1, wherein said sheet of plasticized interlayer material is composed of plasticized polyvinyl butyral.

3. The method as in claim 1, followed by the steps of
   (e) applying to another plasticized sheet of interlayer material having embossed major surfaces an excess of liquid plasticizer,
   (f) assembling said latter plasticized sheet between one of said first named pair of glass sheets and a third glass sheet to form an augmented assembly having said excess of liquid plasticizer in contact with the major surfaces of each of said plasticized sheets,
   (g) soaking said major surfaces of said plasticized sheets with said excess plasticizer at room temperature for sufficient time for the applied plasticizer to soften said embossed major surfaces, but insufficient to normalize the plasticizer concentration throughout the thickness of said plasticized sheets, and
   (h) compressing said augmented assembly at a superatmospheric pressure of not more than two atmospheres to remove excess plasticizer and heating said assembly while so compressed to a temperature range above room temperature and below the temperature at which said plasticizer develops a volatile product to laminate said sheets completely to one another, while maintaining the surfaces of said glass sheets in said augmented assembly that do not form interfacial surfaces with said plasticized sheets free of exposure to said plasticizer during the performance of said method.

4. The method as in claim 1, further including assembling additional assemblies and/or augmented assemblies to form a stack of said assemblies and/or augmented assemblies wherein a first surface of a first glass sheet of each additional assembly or augmented assembly is assembled against an outer surface of a glass sheet of a previously assembled assembly or augmented assembly in such a manner as to prevent plasticizer penetration between adjacent glass sheets of said adjacent assemblies or augmented assemblies, and then compressing said stack of assemblies and/or augmented assemblies to said superatmospheric pressure to remove excess plasticizer and heating said stack to said temperature range while so compressed to laminate the sheets of each of said assemblies and/or augmented assemblies completely to one another while maintaining the outer surfaces of said glass sheets of said assemblies and/or augmented assemblies that do not form interfacial surfaces with said plasticized sheets free of exposure with said plasticizer during performance of said method.

5. The method according to claim 4, wherein after said stack of assemblies and/or augmented assemblies is assembled, the stack is soaked at room temperature for at least 30 minutes prior to subjecting said stack to said temperature range and superatmospheric pressure.

6. The method according to claim 1, wherein said excess plasticizer is removed after a minimum of 30 minutes soaking time at room temperature.

7. The method according to claim 1, wherein said major surfaces of said plasticized sheet are soaked by immersing said plasticized sheet in a bath of liquid plasticizer prior to its assembly between said pair of glass sheets.

8. The method according to claim 1, wherein said excess plasticizer is removed after a maximum soaking time of six hours at room temperature.

9. The method according to claim 8, wherein said excess plasticizer is removed after a maximum soaking time of two hours at room temperature.

10. The method according to claim 1, wherein said excess plasticizer is removed after soaking said major surfaces of said plasticized sheet at room temperature for between 30 minutes and six hours.

* * * * *